United States Patent
Nishida

(10) Patent No.: US 9,426,412 B2
(45) Date of Patent: Aug. 23, 2016

(54) RENDERING DEVICE AND RENDERING METHOD

(75) Inventor: Hideshi Nishida, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 443 days.

(21) Appl. No.: 13/819,770

(22) PCT Filed: May 21, 2012

(86) PCT No.: PCT/JP2012/003315
§ 371 (c)(1),
(2), (4) Date: Feb. 28, 2013

(87) PCT Pub. No.: WO2013/008379
PCT Pub. Date: Jan. 17, 2013

(65) Prior Publication Data
US 2013/0155185 A1 Jun. 20, 2013

(30) Foreign Application Priority Data
Jul. 13, 2011 (JP) .................................. 2011-155062

(51) Int. Cl.
*H04N 7/01* (2006.01)
*G09G 5/14* (2006.01)
(Continued)

(52) U.S. Cl.
CPC ............ *H04N 7/0117* (2013.01); *G06T 3/4092* (2013.01); *G09G 5/026* (2013.01); *G09G 5/14* (2013.01); *G09G 5/373* (2013.01);
(Continued)

(58) Field of Classification Search
None
See application file for complete search history.

(56) References Cited

U.S. PATENT DOCUMENTS 4,536,856 A * 8/1985 Hiroishi ........................ 345/87
6,577,330 B1 6/2003 Tsuda et al.
(Continued)

FOREIGN PATENT DOCUMENTS

| CN | 01626466 A | 1/2010 |
|---|---|---|
| CN | 102132324 A | 7/2011 |

(Continued)

OTHER PUBLICATIONS

Machine level english translation of JP2008116812 A.*
(Continued)

*Primary Examiner* — Tracy Li
*Assistant Examiner* — Mohammad J Rahman
(74) *Attorney, Agent, or Firm* — Wenderoth, Lind & Ponack, L.L.P.

(57) ABSTRACT

A rendering device provides improved rendering responsiveness in multi-window display for rendering scenarios in which display sizes of images vary over time, while also reducing required memory bandwidth. The device comprises: a scenario processor 101 for interpreting a rendering scenario and calculating for each frame period a scale-down ratio for each of a plurality of pictures; a plurality of decoders 107 for decoding encoded data of a plurality of videos; a plurality of first scalers for scaling-down the decoded pictures using the scale-down ratios calculated by the scenario processor 101; a memory 106 for storing the scaled-down pictures; a plurality of second scalers 113 for reading the scaled-down pictures from the memory and re-scaling the scaled-down pictures to match the scale-down ratios calculated by the scenario processor for a current frame period; and, a composing unit 115 for composing the re-scaled pictures.

14 Claims, 15 Drawing Sheets

(51) Int. Cl.
*G09G 5/393* (2006.01)
*G09G 5/395* (2006.01)
*H04N 21/431* (2011.01)
*H04N 5/445* (2011.01)
*H04N 21/426* (2011.01)
*H04N 21/4402* (2011.01)
*G09G 5/02* (2006.01)
*G09G 5/373* (2006.01)
*G09G 5/391* (2006.01)
*G06T 3/40* (2006.01)

(52) U.S. Cl.
CPC ............... *G09G 5/391* (2013.01); *G09G 5/393* (2013.01); *G09G 5/395* (2013.01); *H04N 5/44504* (2013.01); *H04N 21/42653* (2013.01); *H04N 21/4314* (2013.01); *H04N 21/440263* (2013.01); *G09G 2340/0442* (2013.01); *G09G 2340/10* (2013.01); *G09G 2354/00* (2013.01)

(56) References Cited

U.S. PATENT DOCUMENTS

| | | | |
|---|---|---|---|
| 6,836,286 B1 * | 12/2004 | Tachi | H04N 7/15 348/36 |
| 6,937,291 B1 * | 8/2005 | Gryskiewicz | 348/581 |
| 2003/0005439 A1 * | 1/2003 | Rovira | H04N 7/163 725/37 |
| 2005/0032574 A1 * | 2/2005 | Ohta | 463/31 |
| 2006/0115183 A1 * | 6/2006 | Ueda | G06T 3/40 382/298 |
| 2006/0244817 A1 * | 11/2006 | Harville | H04N 7/15 348/14.08 |
| 2007/0279483 A1 * | 12/2007 | Beers | H04L 29/06027 348/14.08 |
| 2008/0252716 A1 * | 10/2008 | Kano | H04N 7/15 348/14.01 |
| 2009/0033999 A1 * | 2/2009 | Nishiyama | G06T 11/203 358/1.18 |
| 2009/0244376 A1 | 10/2009 | Asano et al. | |
| 2010/0007677 A1 | 1/2010 | Kawaguchi | |
| 2010/0026893 A1 | 2/2010 | Sano et al. | |
| 2010/0134488 A1 * | 6/2010 | Kido | G05D 1/0038 345/419 |
| 2011/0134117 A1 | 6/2011 | Uesaki | |
| 2012/0027390 A1 * | 2/2012 | Ueyama | G01C 9/08 396/50 |

FOREIGN PATENT DOCUMENTS

| | | |
|---|---|---|
| JP | 4-115674 | 4/1992 |
| JP | 2003-348444 | 12/2003 |
| JP | 2008-116812 | 5/2008 |
| JP | 2010-32801 | 2/2010 |
| WO | 99/08178 | 2/1999 |

OTHER PUBLICATIONS

Office Action with Search Report issued Feb. 3, 2015 in corresponding Chinese Application No. 201280002862.7 (with English translation of Search Report).

International Search Report issued Aug. 14, 2012 in International (PCT) Application No. PCT/JP2012/003315.

* cited by examiner

FIG. 2

```c
#include <stdio.h>
#include <assert.h>
#include <string.h>
#include <stdlib.h>
#include <math.h>
#include <GL/gl.h>
include <GL/glu.h> int screen_width  = 1920;
int screen_height = 1080;;

#define PI (3.141592653589793238f)

unsigned int s_texID[2];

int  InitializeScene(unsigned int *texid)
{
        // Video 1 pasting
        glGenTextures      ( 1, &s_texID[0] );
        glBindTexture      ( GL_TEXTURE_2D, s_texID[0] );
        glTexImage2D       ( GL_TEXTURE_2D, 0, GL_RGB, height, 0,
                             GL_RGB, GL_UNSIGNED_BYTE, imageData );

// Video 2 pasting
        glGenTextures      ( 1, &s_texID[1] );
        glBindTexture      ( GL_TEXTURE_2D, s_texID[1] );
        glTexImage2D       ( GL_TEXTURE_2D, 0, GL_RGB, height, 0,
                             GL_RGB, GL_UNSIGNED_BYTE, imageData );

return 0;
}
int  DrawScene( int nCount )
{
  float x,y,z,r,i,d,t;
  float t_max = 50.0f;

// Frame unit initialization
        glMatrixMode         ( GL_PROJECTION );
        glLoadIdentity       ();
        glFrustumf(xmin, xmax, ymin, ymax, zNear, zFar);
        glMatrixMode         ( GL_MODELVIEW );
        glLoadIdentity       ();
        glViewport           ( 0, 0, screen_width, screen_height );
        glClear              ( GL_COLOR_BUFFER_BIT |
                               GL_DEPTH_BUFFER_BIT );

// Frame unit general operation notation
        glTranslatef         ( 0.0f, 0.0f, -2.0f );
        glRotatef            (30.0f,1.0f,0.0f,0.0f);
        glEnable             (GL_DEPTH_TEST);
        glPolygonMode        (GL_FRONT_AND_BACK,GL_FILL);
```

FIG. 3

```
       for ( i = 0; i < MAXMODE ; i++ ) {
         r = 5;
         x = r * sin( 2*PI*(i-d-t/t_max)/MAXMODE );
         z = r * cos( 2*PI*(i-d-t/t_max)/MAXMODE ) - r ;

glPushMatrix();
         {
             // Object unit operation description and rendering
           glTranslatef( x, 0.0f ,z );
           glScalef(0.8f,0.8f,0.8f);

drawSceneIndex( nCount,  ( Mode + i ) );
           // Object rendering
         }
         glPopMatrix();
       }
       return 1;
}

//Left-hand image upon left key press
int SelectLeft()                              ─── F1
{      // Left-hand image scale-up 1/5 to 1/2
       glScalef (2.5f,2.5f,0.0f);
       return 1;
}
//Left-hand image upon right key press
int SelectRight()                             ─── F2
{      // Left-hand image scale-down 1/2 to 1/5
       glScalef (0.4f,0.4f,0.0f);
       return 1;
}
```

Frame period

Frame period

RENDERING DEVICE AND RENDERING METHOD

TECHNICAL FIELD

The present invention relates to a rendering device for rendering image objects such as television videos within a screen, and in particular to a multi-window display art in which multiple image objects are rendered within a screen.

BACKGROUND ART

Multi-window display art is used to display various contents simultaneously in devices such as televisions, recorders, tablets and smartphones. Multi-window display is used for example to arrange and display the videos of multiple television broadcast channels within a single screen, or to display a television video with graphics used for interactive operation by a user in a data broadcast composed thereon.

Multi-window display may be realized for example by a method for rendering a virtual space video, wherein a plurality of image objects are pasted onto a plurality of surfaces of a virtual space object in accordance with a rendering scenario written for example using OpenGL.

Image objects displayed on the screen in multi-window display may be television videos which require decoding before being played back, therefore each image object must be stored in a memory until the image objects are composed on a single screen. Consequently, as the number of simultaneously displayed image objects increases the memory bandwidth required also increases. An increase in memory bandwidth is undesirable as it causes an increase in cost.

Patent Literature 1 describes an art for suppressing increases in the memory bandwidth required for multi-window display. In the disclosed art this is achieved by allotting a memory bandwidth to each image based on a rendering command which indicates the display form of the graphics or video. By scaling-down or the like, the resolution of each image is decreased to an appropriate level so that reading and writing of the memory can occur within the allotted memory bandwidth.

CITATION LIST

Patent Literature

Patent Literature 1

Japanese Patent Application Publication No. 2010-032801

SUMMARY OF INVENTION

Technical Problem

Unfortunately, even in devices like the one described above that reduce the required memory bandwidth for multi-window display by scaling-down images before composition on a single screen, there is a demand that the device needs to deal with rendering scenarios for various forms of display.

The present invention aims to provide a rendering device and a method for controlling the rendering device that are capable of performing the multi-window display of various rendering scenarios, while also reducing the memory bandwidth required for multi-window display.

Solution to the Problem

In order to solve the above problems, one aspect of the present invention is a rendering device that renders a virtual space video of a projected virtual space object varying in at least one of shape and position over a plurality of frame periods, and having a plurality of image objects pasted on a plurality of surfaces of the virtual space object in one-to-one correspondence, the rendering device comprising: a scenario processor configured to analyze a rendering scenario of the virtual space video to calculate for each of the frame periods a scale-down ratio with respect to each of a plurality of image objects, the scale-down ratio being for fitting the image object to a region in the virtual space video corresponding to one of the plurality of surfaces of the virtual space object; a plurality of acquiring units each configured to acquire an image object for the frame period; a plurality of first scalers configured to scale-down the acquired image objects; a memory configured to store therein the scaled-down image objects; a plurality of second scalers configured to read from the memory the scaled-down image objects and re-scale each of the scaled-down image objects to match a scale-down ratio calculated by the scenario processor for a current frame period; and a composing unit configured to compose each of the re-scaled image objects on a region in the virtual space video corresponding to one of the surfaces of the virtual space object.

Advantageous Effects of Invention

According to the configuration recited above, through scale-down of the image objects by the first scalers before storage in the memory, both memory bandwidth and memory amount required to store the image objects are reduced. Furthermore, once each of the image objects has been read from the memory it is re-scaled to match the scale-down ratio demanded by the rendering scenario for the current frame period. Therefore, even when a display size of one or more of the image objects changes over time, a composite image for a multi-window display can be rendered without delay due to reading and writing of the memory.

Therefore, even for rendering scenarios in which the display size of images varies over time, it is possible to achieve a multi-window display with improved rendering responsiveness, while also reducing the memory bandwidth.

BRIEF DESCRIPTION OF DRAWINGS

FIG. 2 shows an example of a rendering scenario.

FIG. 3 shows an example of a rendering scenario.

DESCRIPTION OF EMBODIMENTS (Knowledge Forming the Basis for the Present Invention)

In one possible rendering scenario for a multi-window display, the size of an image to be displayed on a screen varies over time. However, it is the knowledge of the present inventor that in the art disclosed in Patent Literature 1, when a rendering scenario includes variation of an image size over time, composition of the multi-window display image is delayed as explained below.

According to the art disclosed in Patent Literature 1, each image undergoes a scale-down procedure before being stored in a memory. However, in the art disclosed in Patent Literature 1, when a rendering scenario changes the size of an image over time, an image size required by the rendering scenario at the time of image composition will differ from an image size read from the memory, due to a delay that occurs when reading and writing the memory. Consequently, the art disclosed in Patent Literature 1 suffers a problem of delayed composition of the multi-window display image.

Figure 15A:
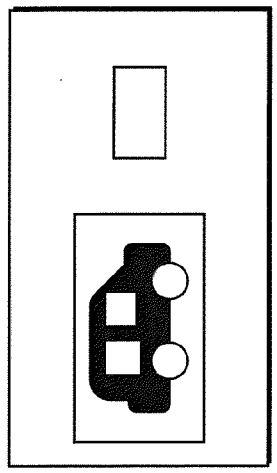
FIG. 15A, FIG. 15B and FIG. 15C show a delay that occurs in a conventional rendering device which controls memory bandwidth to a suitable size.
Figure 15B:
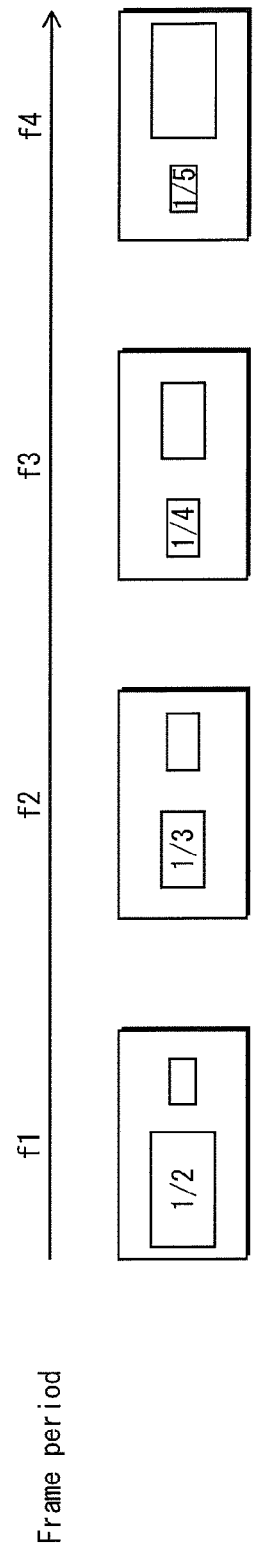

For example, a rendering scenario is envisaged wherein a multi-window display has two images arranged on a screen, with an image selected by a user being larger, equivalent to 1/2 the screen size, and a non-selected image being smaller, equivalent to 1/5 of the screen size, as shown in FIG. 15A. If the non-selected right-hand image is then selected instead of the left-hand image, in the rendering scenario the left-hand image changes from 1/2 to 1/5 of the screen size over frame periods f1 to f4 as shown in FIG. 15B. For frame periods prior to frame period f1 the left-hand image is displayed at a constant size equivalent to 1/2 the screen size.

Figure 15C:
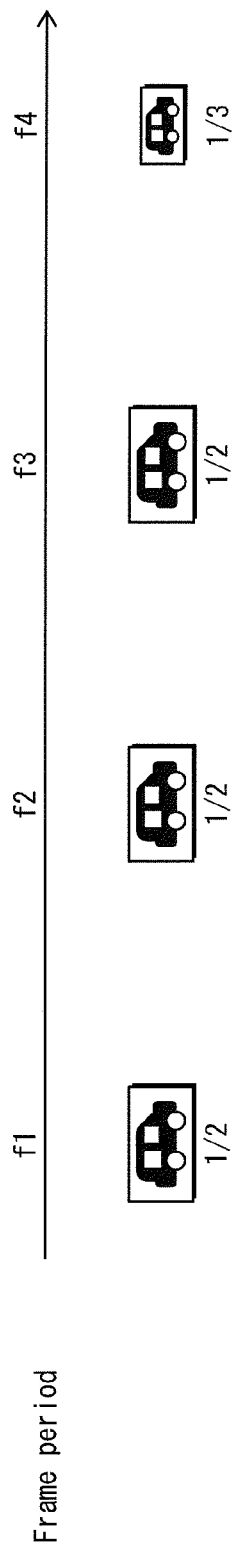

According to the art disclosed in Patent Literature 1, at each frame period the left-hand image is scaled-down to a determined size and stored in the memory. If a delay due to combined actions of reading and writing of the memory is equal to two frame periods, the left-hand image read from the memory to compose a multi-window screen at each frame period will have a size as shown in FIG. 15C. For example, at frame period f3 an image scaled-down to size 1/2 at frame period f1 will be read from the memory. However, the rendering scenario requires an image scaled-down to size 1/4 for screen composition at frame period f3 as shown in FIG. 15B. The result is a difference between the image size required by the rendering scenario and the image size read from the memory, thus preventing composition of the multi-window display screen.

(Outline of the Invention)

The present invention aims to provide a rendering device and a method for controlling the rendering device, capable of improved rendering responsiveness for rendering scenarios wherein a display size of an image varies over time, while also reducing memory bandwidth required for multi-window display.

A first aspect of the present invention is a rendering device that renders a virtual space video of a projected virtual space object varying in at least one of shape and position over a plurality of frame periods, and having a plurality of image objects pasted on a plurality of surfaces of the virtual space object in one-to-one correspondence, the rendering device comprising: a scenario processor configured to analyze a rendering scenario of the virtual space video to calculate for each of the frame periods a scale-down ratio with respect to each of a plurality of image objects, the scale-down ratio being for fitting the image object to a region in the virtual space video corresponding to one of the plurality of surfaces of the virtual space object; a plurality of acquiring units each configured to acquire an image object for the frame period; a plurality of first scalers configured to scale-down the acquired image objects; a memory configured to store therein the scaled-down image objects; a plurality of second scalers configured to read from the memory the scaled-down image objects and re-scale each of the scaled-down image objects to match a scale-down ratio calculated by the scenario processor for a current frame period; and a composing unit configured to compose each of the re-scaled image objects on a region in the virtual space video corresponding to one of the surfaces of the virtual space object.

Through the configuration of the device listed above, the image objects are scaled-down by the first scalers before storage in the memory, thus the required memory bandwidth and memory amount are reduced. Furthermore, by re-scaling each of the image objects after reading from the memory to match the scale-down ratio required by the rendering scenario for the current frame period, even when the display size of one or more of the image objects varies over time a multi-window display composite image can be rendered without experiencing delay due to reading and writing of the memory. Thus, rendering responsiveness is improved for rendering scenarios in which the display size of images varies over time.

However, pre-composition re-scaling of the scaled-down image objects stored in the memory causes a problem of image quality degradation in the composite image.

In response to the above problem, according to a second aspect of the present invention the rendering device in the first aspect may further comprise a plurality of third scalers that are in one-to-one correspondence with the first scalers and are each configured, when a scale-down ratio used by a corresponding first scaler on the acquired image object is smaller than a predetermined scale-down ratio, to create an additionally scaled-down image object, corresponding to the scaled-down image object, using a smaller scale-down ratio than the scale-down ratio used by the corresponding first scaler, and to store both the additionally scaled-down image object and the scaled-down image object in the memory, wherein each of the additionally scaled-down image objects stored in the memory may be read from the memory and re-scaled by the second scalers to create a re-scaled image object, and each of the scaled-down image objects stored in the memory may be only read from the memory and re-scaled by the second scalers to create a re-scaled image object when no additionally scaled-down image object corresponding to the scaled-down image object is stored in the memory.

Through the storage of image objects scaled-down by different ratios in the memory, a number of instances is reduced in which re-scaling of an image object is required. Furthermore, even if re-scaling is required, by using an image object with a closer scale-down ratio to the required scale-down ratio, the amount of image quality degradation is suppressed.

Consequently, the second aspect of the present invention reduces costs by reducing the required memory bandwidth and memory amount, while also improving both the image quality and responsiveness to changes in image size, thus allowing a greater degree of expressivity in multi-window display.

In the second aspect, according to a third aspect of the present invention the additionally scaled-down image object may be a mipmap of the acquired image object.

The general form of a mipmap is a group of images in which an original image is scaled-down to sizes in the series 1/2, 1/4, 1/8, 1/16, and so on, where 1/2 is raised to successive integer powers. The art of mipmap creation improves picture quality when creating an image which has a high scale-down ratio.

In the third aspect, according to a fourth aspect of the present invention the predetermined scale-down ratio may be 3/4.

In general the total data amount of a mipmap does not exceed 1/3 of the data amount of an original image. Consequently, if the scale-down ratio of one of the first scalers is at most 3/4, the total data amount of a mipmap created from an image object scaled-down by the first scalers will be at most 1/4 of the data amount of a corresponding original image acquired by the acquiring units, and furthermore the combined total data amount of the image object scaled-down by the first scalers and the mipmap will not exceed the data amount of the original image.

In the first aspect, according to a fifth aspect of the present invention a delay equivalent to a frame period k may occur for combined actions of writing to and reading from the memory each of the scaled-down image objects, and when one of the acquired image objects is scaled-down by one of the first scalers using a scale-down ratio S1 at a frame period t-k temporally in the past, one of the second scalers reads from the memory the scaled-down image object scaled-down using the ratio S1 and may re-scale the scaled-down image object for a current frame period t where the scale-down ratio calculated by the scenario processor is S2, by using a factor of S2/S1.

Through the above recited configuration, even if the scale-down ratio calculated by the scenario processor varies over multiple frame periods, the re-scaled image object acquired from the second scaler will have the scale-down ratio required for the current frame period. Therefore, for rendering scenarios in which the display size of images varies over time, an improvement in rendering responsiveness is achieved.

In the fifth aspect, according to a sixth aspect of the present invention the scale-down ratio used by each of the first scalers may be the scale-down ratio calculated by the scenario processor with respect to each of the image objects for the current frame period.

In the configuration recited above, the scaled-down image object read from the memory for the current frame period t is the acquired image object scaled-down using the scale-down ratio S1 at the frame period t-k, however through re-scaling of the scaled-down image object by a factor of S2/S1 by the second scaler, an re-scaled image object scaled-down with the scale-down ratio S2 required for the current frame period t is acquired.

In the fifth aspect, according to a seventh aspect of the present invention the smaller a shape specified by the rendering scenario for each of the image objects, the smaller a scale-down ratio used by each of the first scalers may be.

When image quality degradation occurs due to scaling-down, the smaller the shape indicated for the image object by the rendering scenario, the less visually obvious image quality degradation is. In the configuration of the seventh aspect of the present invention recited above, the less visually obvious image quality degradation due to scaling-down is for the image object, the smaller the size the image object is scaled-down to, and as a consequence the required memory bandwidth is further reduced while also suppressing the visual effect of image quality degradation.

In the fifth aspect, according to an eighth aspect of the present invention the larger a distortion in an image object pasting shape specified by the rendering scenario for each of the image objects compared to an original shape of the image object, the smaller a scale-down ratio used by each of the first scalers may be.

When image quality degradation occurs due to scaling-down, the greater the distortion of the image object pasting shape indicated by the rendering scenario compared to the original shape of the image object, the less visually obvious any image quality degradation is. In the configuration of the eighth aspect of the present invention recited above, the less visually obvious image quality degradation due to scaling-down is for the image object the smaller the size the image object is scaled-down to, and as a consequence the required memory bandwidth is further reduced while also suppressing the visual effect of image quality degradation.

In the fifth aspect, according to a ninth aspect of the present invention the larger a variation over time in an image object pasting position specified by the rendering scenario for each of the image objects, the smaller a scale-down ratio used by each of the first scalers may be.

When image quality degradation occurs due to scaling-down, the greater the variation over time in pasting position of the image object indicated by the rendering scenario, the less visually obvious image quality degradation is. In the configuration of the ninth aspect of the present invention recited above, the less visually obvious image quality degradation due to scaling-down is for the image object the smaller the size the image object is scaled-down to, and as a consequence the required memory bandwidth is further reduced while also suppressing the visual effect of image quality degradation.

In the fifth aspect, according to a tenth aspect of the present invention, may further comprise a plurality of image feature detection units each configured to detect a human figure image from an image object, wherein the smaller the human figure image detected in each of the image objects by the feature detection units, the smaller a scale-down ratio used by each of the first scalers may be.

When image quality degradation occurs due to scaling-down, the smaller the human figure image is in the image object, the less visually obvious image quality degradation is. In the configuration of the tenth aspect of the present invention recited above, the less visually obvious image quality degradation due to scaling-down is for the image object the smaller the size the image object is scaled-down to, and as a consequence the required memory bandwidth is further reduced while also suppressing the visual effect of image quality degradation.

In the fifth aspect, according to an eleventh aspect of the present invention the plurality of image objects may include at least one pair of viewpoint images to be used in stereoscopic playback, and a scale-down ratio used by one of the first scalers on one of the pair of viewpoint images may be larger than a scale-down ratio used by another one of the first scalers on the other of the pair of viewpoint images.

For the pair of viewpoint images, by giving priority to the viewpoint images to be emphasized and scaling-down the other viewpoint image to a smaller size, the required memory bandwidth is further reduced while also suppressing the visual effect of image quality degradation.

Embodiments of the present invention are explained below with reference to the drawings.

(First Embodiment)

Figure 1:
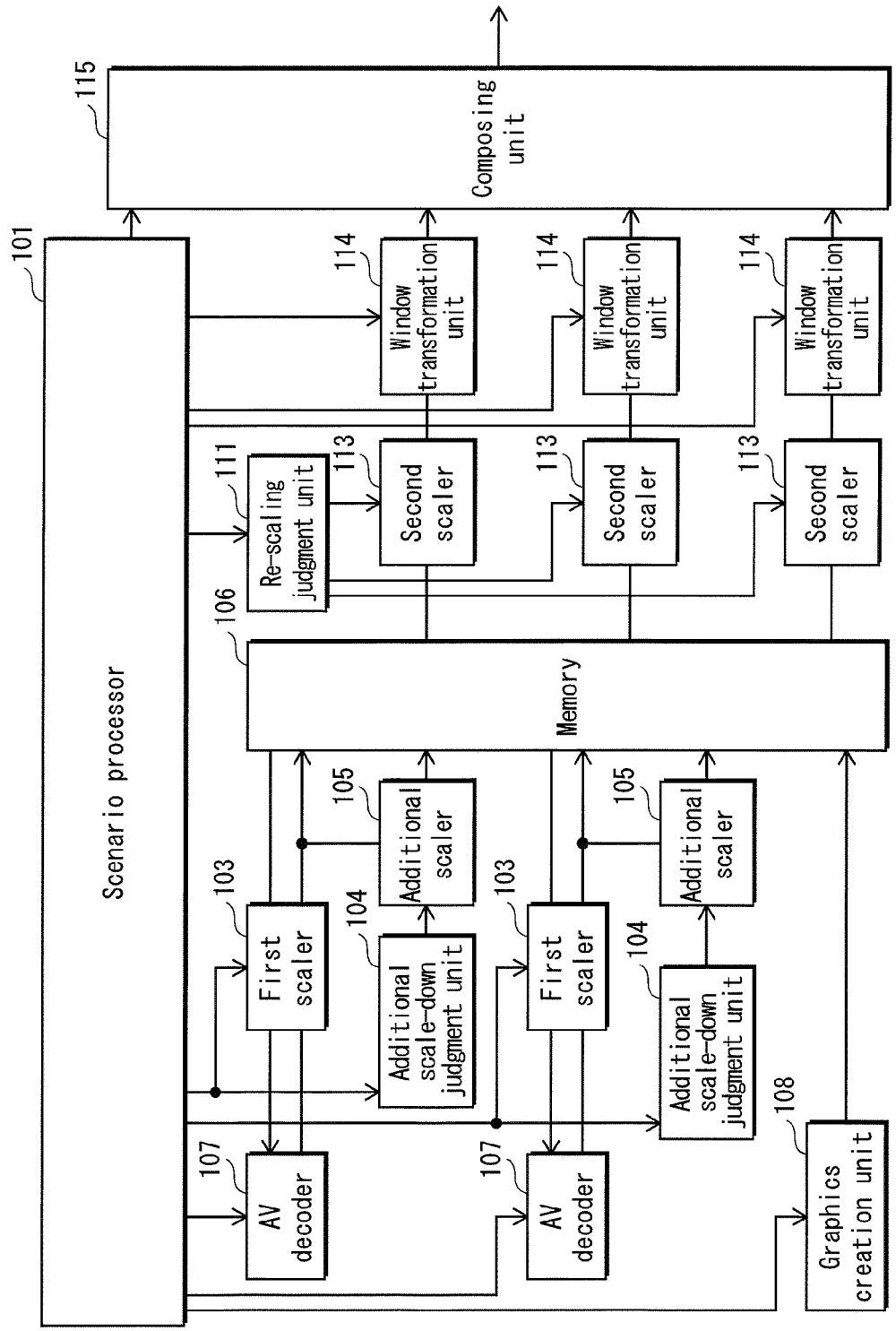
FIG. 1 is a block diagram of a multi-window rendering device relating to a first embodiment.

FIG. 1 shows the hardware configuration of a rendering device relating to a first embodiment of the present invention. The rendering device itself may be used directly by a user in that form or be incorporated into various electronic devices. A representative example of the rendering device is a television receiver. Alternatively the rendering device could be a general purpose computer such as a Personal Computer (PC), an AV device such as an AV playback device, a Personal Digital Assistant (PDA), a tablet, or a communication terminal such as a cellular phone.

The rendering device includes a scenario processor 101, a AV decoder 107, a graphics creation unit 108, a first scaler 103, an additional scale-down judgment unit 104, an additional scaler 105, a memory 106, a re-scaling judgment unit 111, a second scaler 113, a window transformation unit 114 and a composing unit 115. The present embodiment is explained based on a multi-window display system in which the data of two videos are arranged and displayed on the same screen, therefore the rendering device has two, the same number as the videos, of each of the scaler 103, the additional scale-down judgment unit 104, the additional scaler 105, the AV decoder 107, the re-scaling judgment unit 111, the second scaler 113 and the window transformation unit 114.

The scenario processor 101 analyzes a rendering scenario, written for example using OpenGL, and acquires from the scenario information such as a viewpoint position, three dimension co-ordinates of a plurality of windows in a multi-window display, sizes of the windows, and which video to paste as an image object in each of the windows.

The scenario processor 101 also calculates for each frame period a scale-down ratio for each of the videos in order that a picture size of 1920 pixels vertically and 1080 pixels horizontally can be adjusted to fit the size of each of the windows. The scenario processor 101 then notifies the AV decoders 107, the graphics creation unit 108, the first scalers 103, the additional scale-down judgment units 104 and the re-scaling judgment units 111 of the calculated scale-down ratios.

Each of the AV decoders 107 functions as an acquiring unit that acquires at each of a plurality of frame periods uncompressed format picture data to be used as an image object, by decoding encoded video data for the picture size of 1920 pixels vertically and 1080 pixels horizontally.

Each of the first scalers 103 has a function of scaling-up and scaling-down pictures by means of an enlargement filter and a reduction filter which carry out bilinear interpolation. The first scalers 103 reduce the number of pixels of the uncompressed format pictures acquired by the AV decoders 107 based on the scale-down ratios notified by the scenario processor 101. The first scalers 103 store in the memory 106 a plurality of scaled-down pictures created by reduction in the number of pixels. The first scalers 103 have an additional function of scaling-up the pictures stored in the memory 106 using the enlargement filter and transferring the pictures to the AV decoders 107 to be used as reference images in decoding.

Each of the additional scale-down judgment units 104 compares the scale-down ratio notified by the scenario processor 101 with a predetermined threshold value Th. If the scale-down ratio notified by the scenario processor 101 is equal to or larger than the threshold value Th the additional scale-down judgment unit 104 sends an order to a corresponding additional scaler 105 not to operate. Conversely, if the scale-down ratio notified by the scenario processor 101 is smaller than the threshold value Th the additional scale-down judgment unit 104 sends an order to the corresponding additional scaler 105 to create an additionally scaled-down picture from the uncompressed format picture created by a corresponding AV decoder 107.

Figure 6:
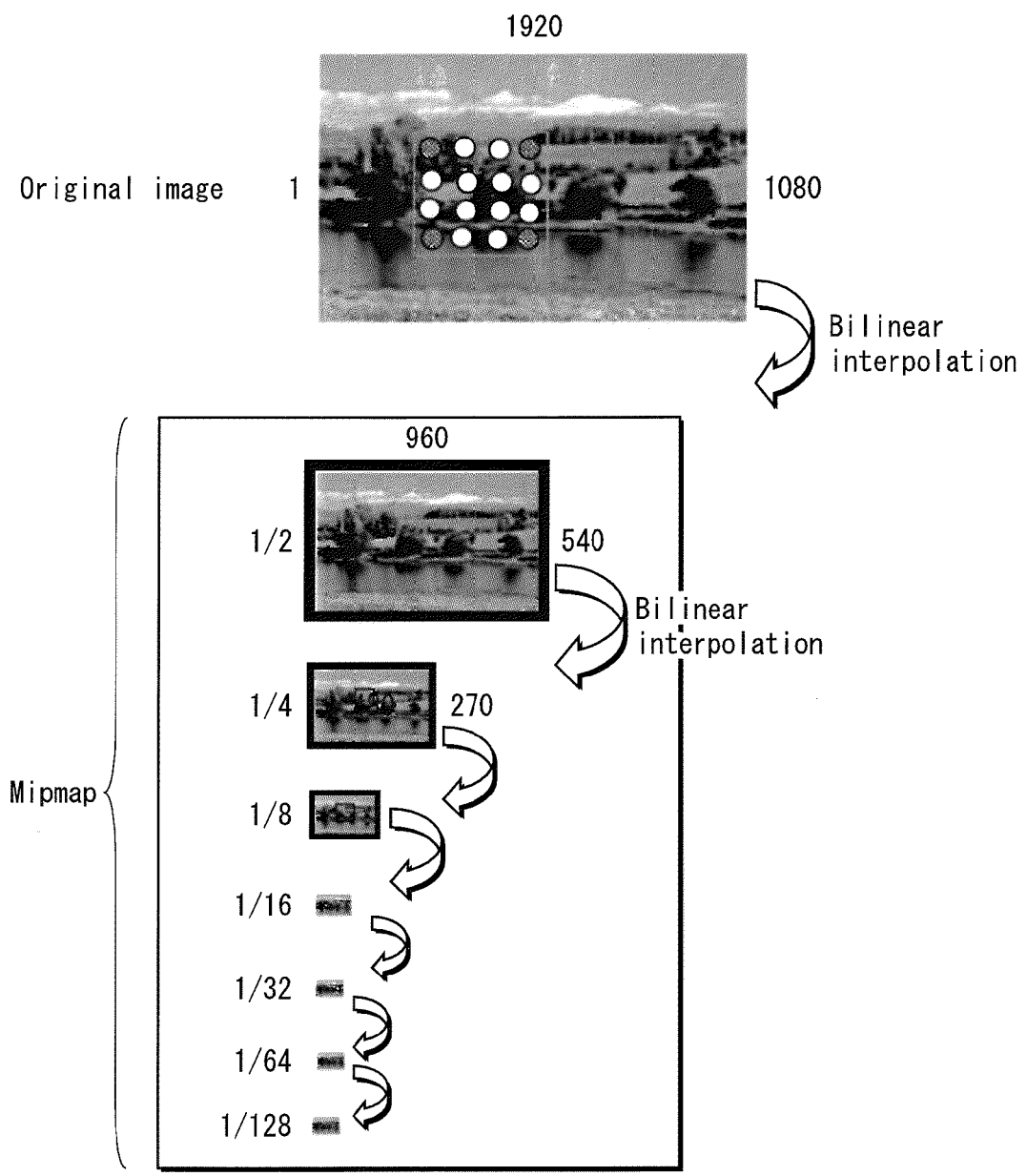
FIG. 6 shows an example of a mipmap created by an additional scaler.

Each of the additional scalers 105, upon receiving an order to create a scaled-down picture by a corresponding additional scale-down judgment unit 104, further reduces the pixel number of the scaled-down picture output by a corresponding first scaler 103, creating pictures belonging to an additionally scaled-down picture group having vertical and horizontal sizes compared to the picture output by the corresponding first scaler 103 of 1/2, 1/4, 1/8, 1/16, . . . , 1/128, as shown in FIG. 6. The additional scaler 105 stores the additionally scaled-down pictures in the memory 106. This art is generally referred to as mipmapping and has the effect of improving image quality when creating images which have a high scale-down ratio. The total data amount of a mipmap does not exceed 1/3 of the data amount of the original image. When creating a mipmap as an additional scale-down of a picture, it is desirable to set the threshold value Th to no more than 3/4 to ensure that memory bandwidth is not increased.

The graphics creation unit 108, based on each of the scale-down ratios notified by the scenario processor 101, converts a set of coordinates of a polygon, creates graphics to form an image for a window frame surrounding the converted coordinates, and stores the graphics in the memory 106.

The Memory 106 stores therein picture data created by the first scalers 103, the additional scalers 105, and the graphics creation unit 108. In the memory 106 a combined processing time equivalent to two frame periods is required to write picture data to the memory 106 and then read the same picture data from the memory 106.

Each of re-scaling judgment units 111 has a buffer memory which stores the scale-down ratio notified by the scenario processor 101 for two frame periods. The re-scaling judgment unit 111 compares for each frame period the scale-down ratio notified by the scenario processor 101 and a scale-down ratio stored in the buffer memory two frame periods previously. If there is a change between the two scale-down ratios, the re-scaling judgment unit instructs one of the second scalers 113 to carry out re-scaling of a scaled-down picture read from the memory 106.

The second scalers 113 read the video images and the graphics images stored in the memory 106, and either enlarge or reduce each of the images in accordance with a scale-up ratio or a scale-down ratio determined by the re-scaling judgment units 111.

Each of the window transformation units 114, based on the analysis of the rendering scenario by the scenario processor 101, creates a polygon in a three dimensional space, pastes a video to the polygon, and creates a transformed window viewed from a particular viewpoint.

The composing unit 115, in accordance with the analysis of the rendering scenario by the scenario processor 101, pastes each of a plurality of pictures to become an image object on one of a plurality of surfaces of a virtual space body, and renders a virtual space video which is a projection of the virtual space object as a multi-window display screen. More specifically, the composing unit 115 composes each of the window frame graphics created by the plurality of window transformation units 114 on a single screen. The composing unit 115 then pastes the plurality of re-scaled pictures, output by the second scalers 113, as image objects to positions of each of the plurality of windows in one-to-one correspondence creating a multi-window image.

The above describes the configuration of the rendering device.

<Rendering Scenario>

Figure 4:
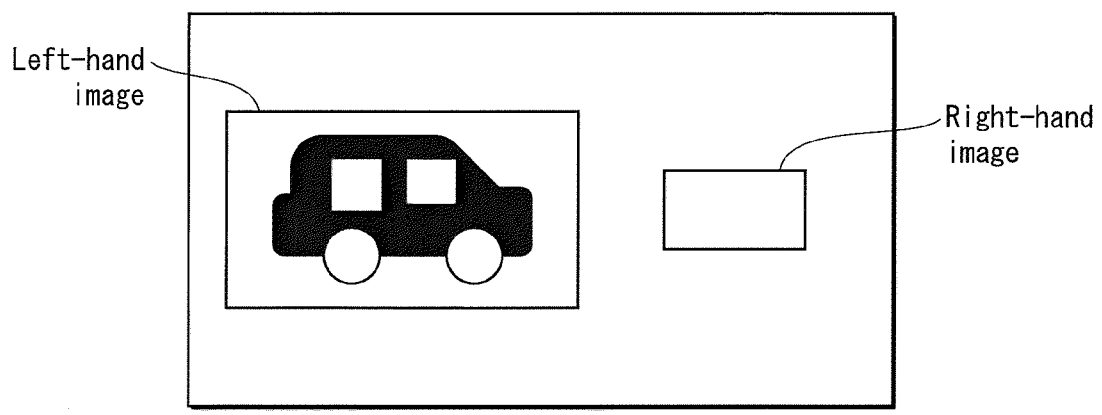
FIG. 4 shows a multi-window screen rendered by the rendering scenarios in FIG. 2 and FIG. 3.
Figure 5:
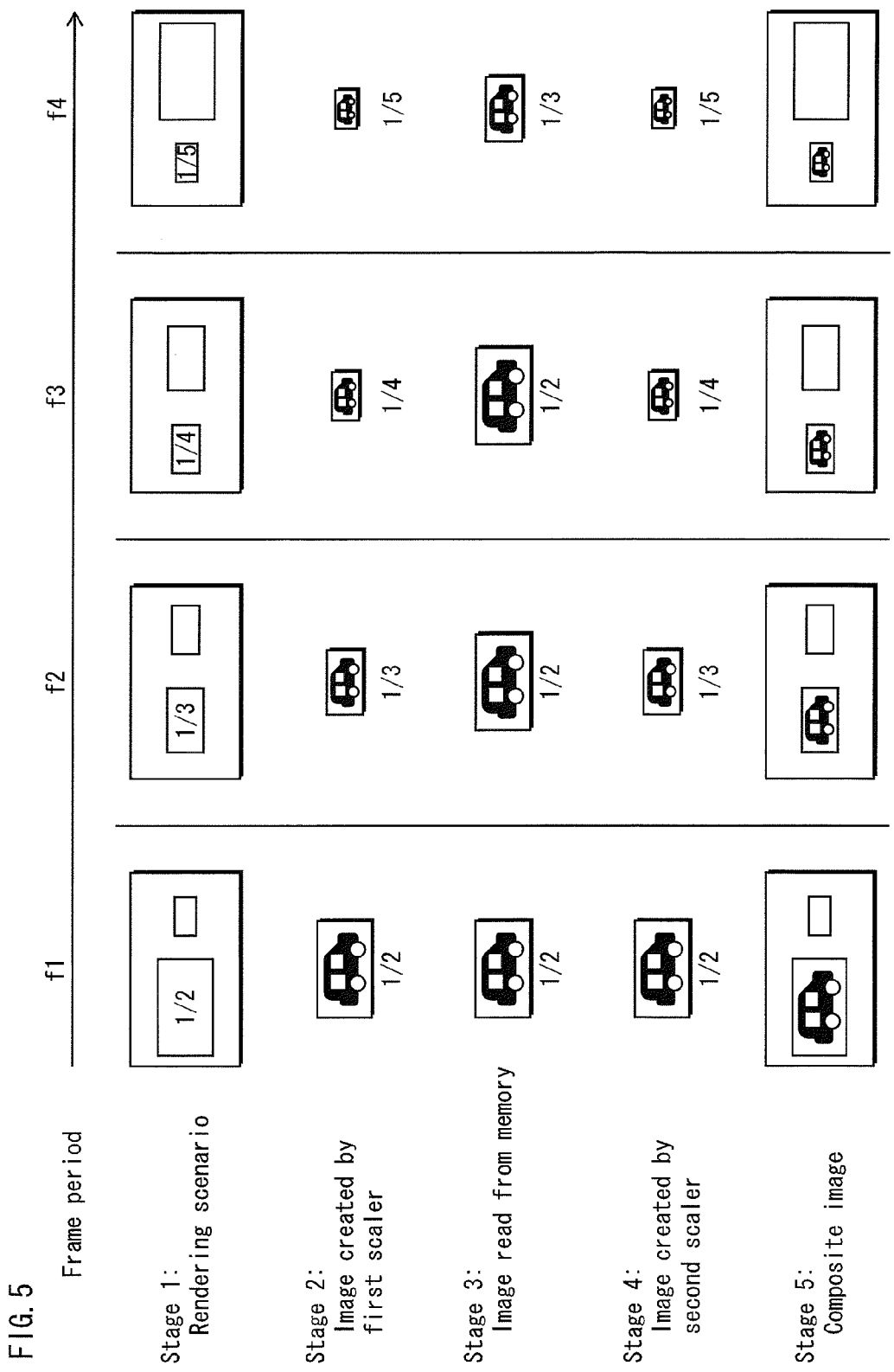
FIG. 5 is a schematic of a change in the display that occurs for the rendering scenarios in FIG. 2 and FIG. 3.

The rendering scenario is explained below. FIG. 2 and FIG. 3 show examples of rendering scenarios written using OpenGL. FIG. 4 and FIG. 5 are drawings of multi-window displays created by the rendering scenarios in FIG. 2 and FIG. 3.

Mathematical functions are included in the rendering scenario that cause the modification of the multi-window display image, when a "left" button or a "right" button of a remote controller is pressed, so that an image object indicated by the direction of the button press is enlarged. For example, functions F1 and F2 are functions that modify the size of an image displayed on the left side of the screen when the "left" button or the "right" button of the remote controller is pressed. The size and shape each of the image objects in the multi-window display are changed through the execution of the functions by the scenario processor 101.

More specifically, FIG. 4 shows how in the rendering scenarios shown in FIG. 2 and FIG. 3, two images the same size as the screen frame are scaled-down. An image selected by a user is displayed at a size of 1/2 the screen size and a non-selected image is displayed at a size of 1/5 the screen size. By arranging and displaying the two images on the same screen, a multi-window display is realized. A further feature of the rendering scenario is that as shown in Stage 1 of FIG. 5, when at frame period fl the user changes their selection from the selected left-hand image to the non-selected right-hand image, the left-hand image is changed from 1/2 to 1/5 of the screen size, and the right-hand image is changed from 1/5 to 1/2 of the screen size over frame periods f1 to f4. Furthermore, in FIG. 5 prior to frame period f1 there is no change in image selection and the left-hand image is displayed continuously at 1/2 of the screen size.

When the type of rendering scenario described above is analyzed by the scenario processor 101, a required size for the left-hand image is calculated for each frame period, and the size is notified to one of the first scalers 103 and one of the second scalers 113. Stage 2 of FIG. 5 shows how for each frame period the left-hand image is scaled-down by the first scaler 103 to the notified size and stored in the memory.

In the present embodiment the delay that accompanies combined actions of writing into and reading from the memory is equivalent to two frame periods. Therefore, for each frame period a left-hand image read from the memory to compose a multi-window screen will be as shown in Stage 3 of FIG. 5. For example, at frame period f3 a scaled-down image that was scaled down to 1/2 at frame period f1 is read from the memory. However, as shown in Stage 2 of FIG. 5, the rendering scenario requires the left-hand image to be scaled down to 1/4 size at frame period f3 for composition of the multi-window screen. Consequently, the scaled-down image read from the memory cannot be used in that form to compose the multi-window screen.

The second scaler 113 performs re-scaling of the scaled-down image read from the memory to modify the scale-down ratio as shown in Stage 4 of FIG. 5. The scaling ratio used by the second scaler 113 at this time is equal to the scale-down ratio S2 required for the current frame period divided by the scale-down ratio S1 of the scaled-down image read from the memory. In the example shown in FIG. 5, at frame period f3 the scaled-down image read from the memory is re-scaled by a factor of S2/S1 (=1/2). The effect is that at frame period f3, the second scaler 113 outputs a re-scaled image scaled-down to 1/4 of the screen size, and the re-scaled image is used to compose the multi-window screen as shown in Stage 5 of FIG. 5.

The input device may for example be a touch panel or a pointer of a device such as a mouse instead of the remote controller.

<Operation>

Figure 7:
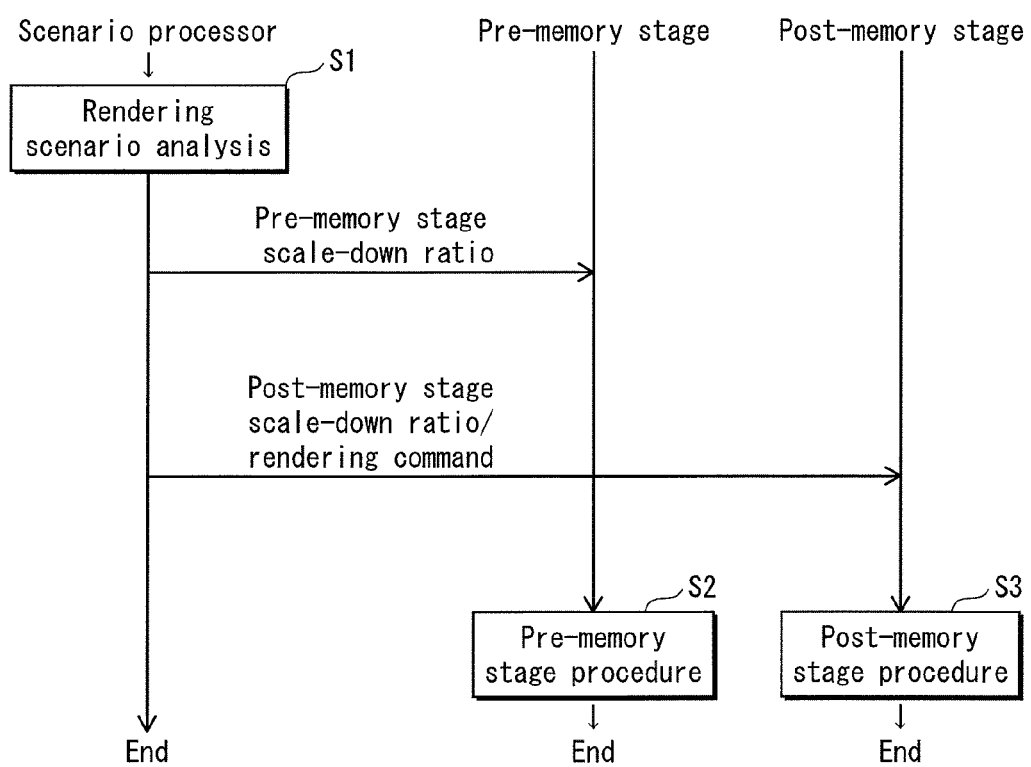
FIG. 7 shows the operation of the multi-window rendering device over one frame period.

The operation of the rendering device will now be explained. FIG. 7 shows the operation of the rendering device for one frame period.

For each frame period the scenario processor 101 analyzes the rendering scenario, calculating a scale-down ratio for each of a plurality of pictures and three dimension coordinates for windows each of a plurality of images will be pasted to, the calculated values being appropriate for multi-window display (Step S1). The scenario processor 101 then notifies the calculated scale-down ratio for each of the pictures to the first scalers 103, the additional scale-down judgment units 104, the AV decoders 107 and the graphics creation unit 108 which form a pre-memory stage, and a pre-memory stage procedure is performed (Step S2). Additionally, the scenario processor 101 notifies the calculated scale-down ratio for each of the pictures and the three dimensional coordinates for each of the windows to the re-scaling judgment units 111, the window transformation units 114 and the composing unit 115 which form a post-memory stage, and a post-memory stage procedure is performed (Step S3).

By repeating the operation shown in FIG. 7 for each frame period, the rendering device arranges and displays a plurality of videos, for example from television broadcasts, creating a multi-window display.

Below the pre-memory and post-memory stages are described in detail.

Figure 8:
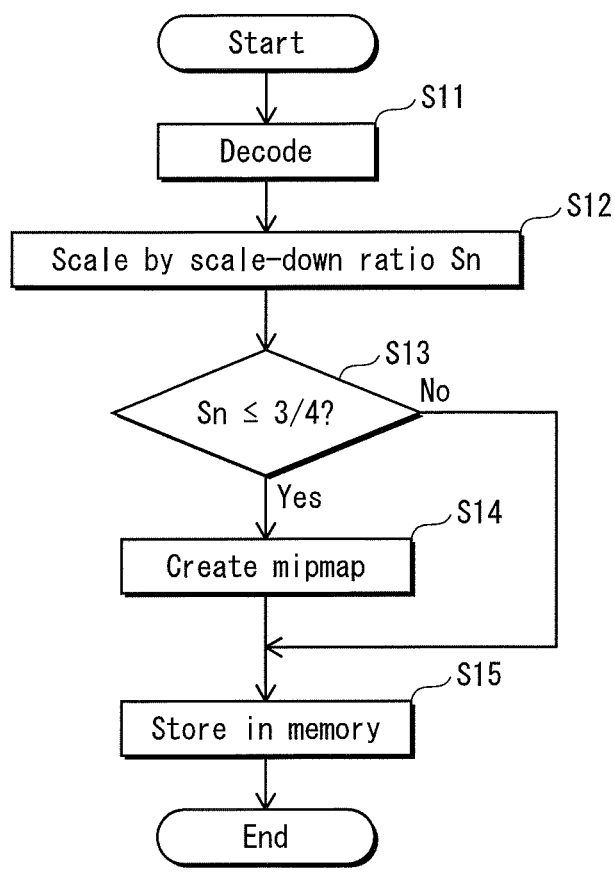
FIG. 8 is a flow chart for a procedure of storing an image object in a memory in a pre-memory stage.
Figure 9:
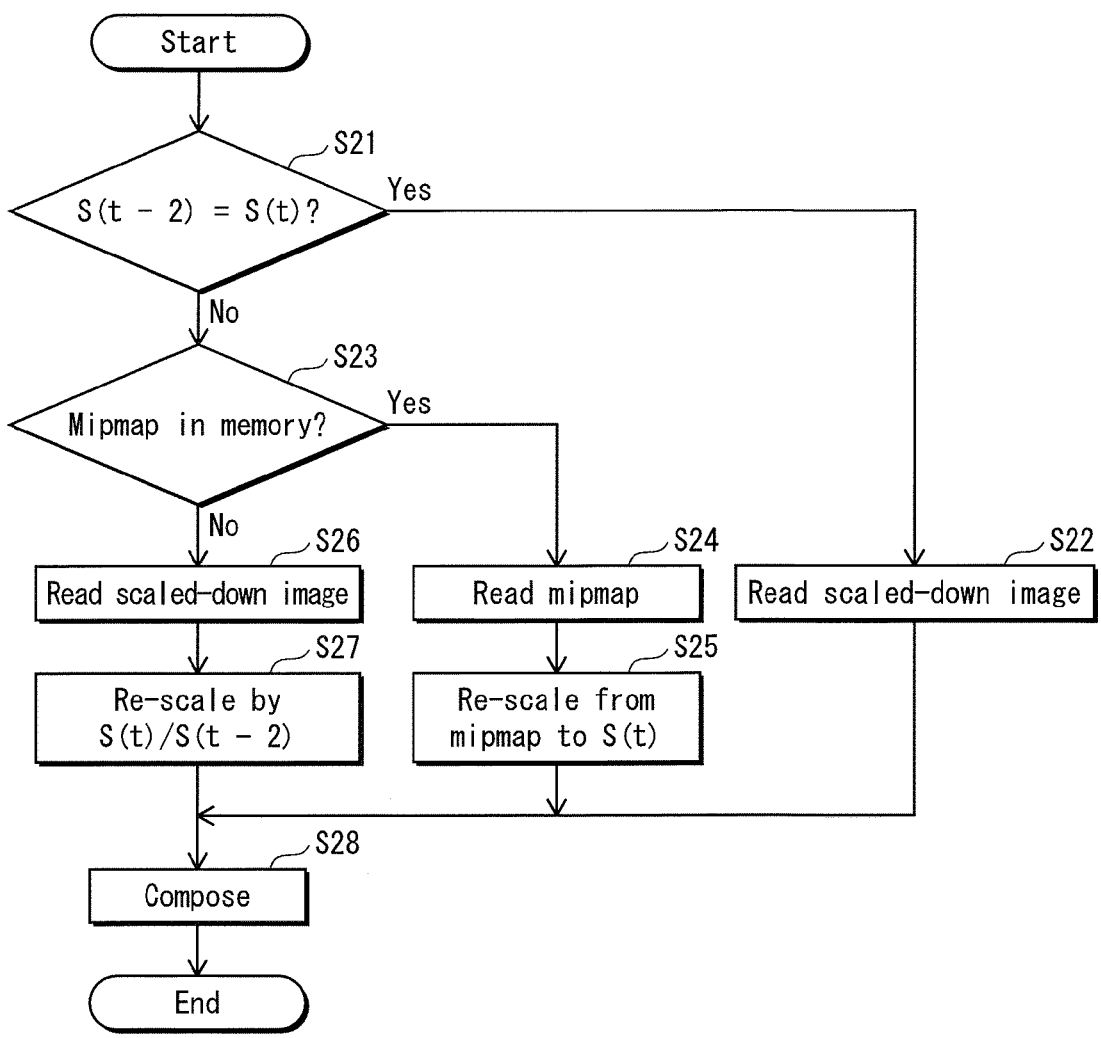
FIG. 9 is a flow chart for a procedure of rendering a composite image in a post-memory stage.

FIG. 8 is a flowchart showing in detail the pre-memory stage procedure of storing an image object in the memory. FIG. 9 is a flowchart showing the post-memory stage procedure of rendering a composite image.

In the pre-memory stage, first each of the AV decoders 107 decodes encoded data of a target data to create an uncompressed format picture (Step S11). The picture created in the procedure above is for a screen size of 1920 pixels vertically and 1080 pixels horizontally.

In Step S12, each of the first scalers 103 creates a scaled-down picture using a scale-down ratio notified by the scenario processor 101.

In Step S13, each of the additional scale-down judgment units 104 judges if a scale-down ratio notified by the scenario processor 101 is no more than 3/4. If the scale-down ratio is no more than 3/4 (Step S13: Yes) the additional scale-down judgment unit 104 instructs a corresponding additional scaler 105 to create a mipmap.

If the scale-down ratio notified by the scenario processor 101 is greater than 3/4 (Step S13: No), the scaled-down picture created in Step S12 is stored in the memory 106 (Step S15), and the pre-memory stage procedure is complete. If the scale-down ratio notified by the scenario processor 101 is no more than 3/4 (Step S13: Yes), the additional scaler 105, on receiving an instruction from the corresponding additional scale-down judgment unit 104, creates a mipmap using the scaled-down picture output by the first scaler 103 as an original picture (Step S14). The scaled-down picture and the mipmap created in the procedure recited above are stored in the memory 106 (Step S15), and the pre-memory stage procedure is complete.

As shown in FIG. 9, in the post-memory stage procedure at Step S21 each of the re-scaling judgment units 111 compares a scale-down ratio S(t) for a current frame period notified by the scenario processor 101 and a scale-down ratio S(t−2) notified by the scenario processor 101 two frame periods prior to the current frame period. If the two scale-down ratios are identical (Step S21: Yes), one of the second scalers 113 reads the scaled-down picture from the memory (Step S22), and outputs the scaled-down picture without re-scaling to the composing unit 115. The composing unit 115 composes the multi-window screen (Step S28), thus completing the post-memory stage procedure.

If at the judgment in Step S21 the two scale-down ratios are different (Step S21: No), the re-scaling judgment unit 111 notifies the scale-down ratios S(t) and S(t−2) to the second scaler 113, and instructs the second scaler 113 to perform re-scaling of the scaled-down picture.

When the second scaler 113 is instructed to perform re-scaling, if there is a mipmap stored in the memory 106 corresponding to the scaled-down picture (Step S23: Yes), the second scaler 113 reads the mipmap from the memory (Step S24), and creates a re-scaled picture, having the scale-down ratio S(t), from the mipmap data (Step S25).

If a corresponding mipmap has not been stored in the memory 106 (Step S23: No), the second scaler 113 reads the scaled-down picture scaled with a scale-down ratio of S(t−2) from the memory (Step S26), and creates a re-scaled picture by re-scaling the scaled-down picture read from the memory by a factor of S(t)/S(t−2) (Step S27).

Each of the second scalers 113 outputs a re-scaled picture created in either Step S25 or Step S27 to the composing unit 115 which composes a multi-window screen (Stage S28), thus the post-memory stage procedure is complete.

The above explains the operation of the rendering device.

In the described configuration of the present embodiment, by scaling-down the plurality of pictures to become image objects before storage in the memory the required memory bandwidth is reduced. Also, by re-scaling each of the scaled-down pictures read from the memory to match the scale-down ratio required for the current frame period, multi-window display in which there is a high level of responsiveness to the rendering scenario is realized.

Furthermore, the present embodiment was explained for a rendering device using the data of two videos and consequently having two of each of the first scaler 103, the additional scale-down judgment unit 104, the additional scaler 105, the AV decoder 107, the re-scaling judgment unit 111, the second scaler 113, and the window transformation unit 114. However, each of the above mentioned configuration elements is not limited to two, and if multi-window display is to be used to arrange and display the data of more than two videos on one screen, the device may have a configuration with at least three of each of the above mentioned configuration elements.

In the present embodiment encoded video data is decoded to acquire a picture for a screen size of 1920 pixels vertically and 1080 pixels horizontally, however each of the AV decoders 107 when decoding encoded video data may, based on a scale-down ratio notified by the scenario processor 101, reduce a number of pixels created by orthogonal modification, or reduce a number of pixels referenced or created during movement compensation. Thus, calculation amount and memory bandwidth required for decoding are reduced. In decoding of the type described above, if pixel size of a picture has already been reduced compared to an original image of 1920 pixels vertically and 1080 pixels horizontally, the first scaler 103 calculates a new scale-down ratio using a ratio of the pixel size of the picture created by the AV decoder 107 and the scale-down ratio notified by the scenario processor 101. The number of pixels of the picture is reduced using the calculated new scale-down ratio.

In the present embodiment each of the additional scalers 105 creates an additionally scaled down picture using a scaled-down picture output by a corresponding first scaler 103 as an original image. Alternatively, the additional scaler 105 could use an uncompressed format picture created by a corresponding AV decoder 107 as an original image. Through the use of the uncompressed format picture created by the AV decoder 107, image quality degradation occurring as a consequence of re-scaling the picture scaled-down by the first scaler 103 is avoided.

If the additional scaler 105 creates an additionally scaled-down picture using the uncompressed format picture created by the AV decoder 107 as the original image, it is desirable that the threshold value Th, used by the corresponding additional scale-down judgment unit 104 to judge if a scaled-down picture should be created or not, should be set at no larger than 2/3. If the scale-down ratio used by the first scaler 103 is no larger than 2/3, even if the additional scaler 105 creates an additionally scaled-down picture, a total data amount of the scaled-down picture created by the first scaler 103 and the mipmap format additionally scaled-down picture created by the additional scaler 105 will not exceed a data amount of the uncompressed format picture created by the AV decoder 107. Thus, the memory bandwidth is not increased.

(Second Embodiment)

Figure 10:
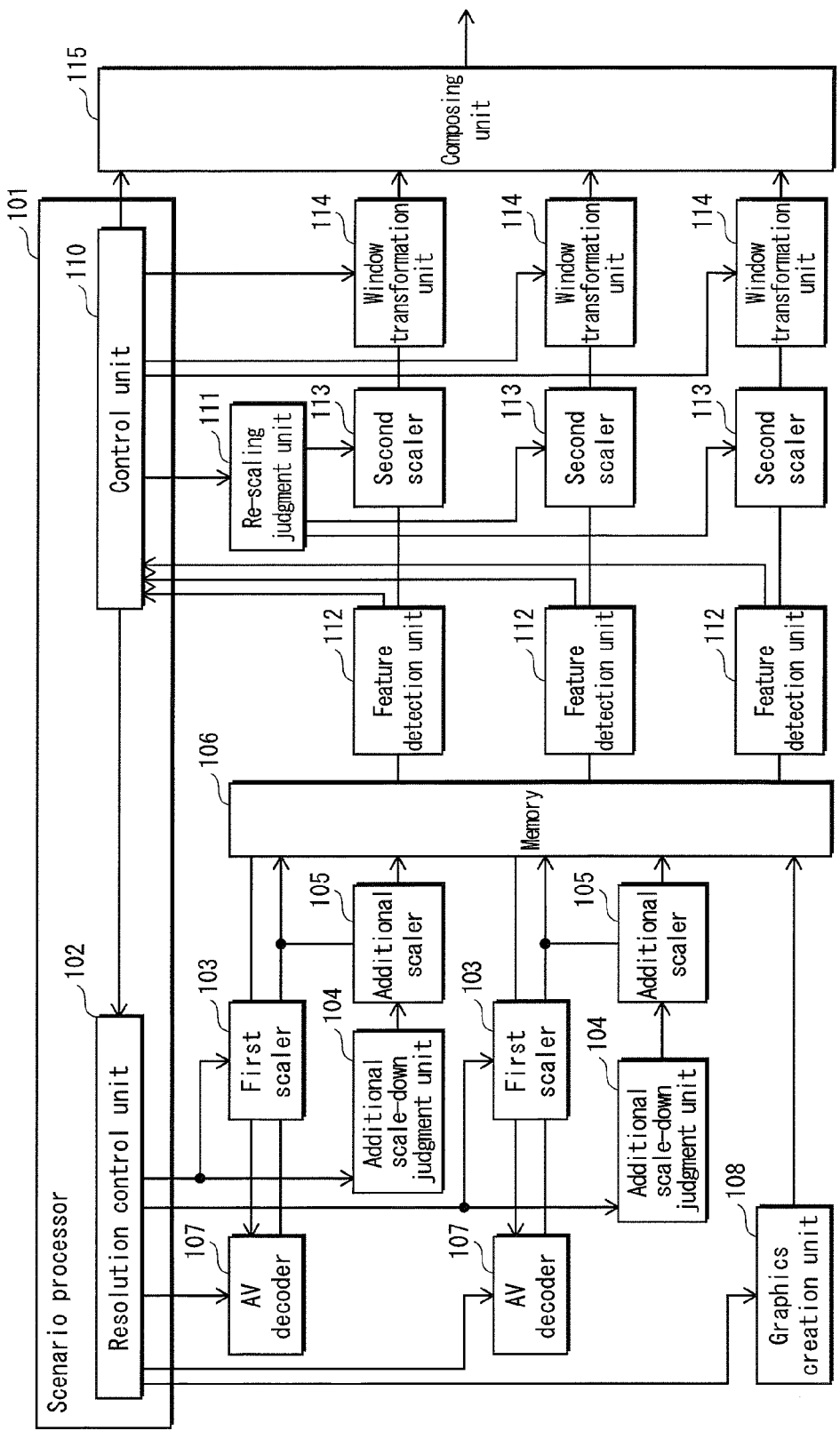
FIG. 10 is a block diagram of a multi-window rendering device relating to a second embodiment.

FIG. 10 shows the hardware configuration of a rendering device relating to a second embodiment of the present invention.

Compared to the configuration of the rendering device relating to the first embodiment shown in FIG. 1, the rendering device relating to the second embodiment additionally comprises a control unit 110, a resolution control unit 102 and a plurality of feature detection units 112. Furthermore, in the second embodiment a multi-window display with two videos arranged within a screen is realized by scaling-down two videos so that an image selected by a user is displayed large at a size equivalent to 1/2 the screen size, and a non-selected image is displayed at thumbnail size. In the rendering device relating to the first embodiment the scaled-down picture created by each of the additional scalers 105 is a mipmap, however in the rendering device relating to the second embodiment each of the additional scalers 105 creates a thumbnail size scaled-down picture.

Below the configuration elements added to the rendering device relating to the first embodiment shown in FIG. 1 are explained.

The control unit 110 is a functional block that carries out the function of analyzing a rendering scenario written for example in OpenGL, as explained as one of the functions of the scenario processor 101 in the first embodiment.

The resolution control unit 102 is a configuration element that realizes an additional function of the scenario processor 101 in the rendering device relating to the second embodiment. The resolution control unit 102 judges which of a plurality of windows arranged in a multi-window display are visually important and assigns an order of priority to the windows based on predetermined standards. The resolution control unit 102 calculates a scale-down ratio for each of a plurality of pictures at each of a plurality of frame periods based on the order of priority.

Possible examples of the predetermined standards recited above include giving preference in the order of priority to videos with large window sizes, videos to be pasted to windows with little variation in shape from the original video, videos in windows which have little positional variation over a plurality of frame periods, images of viewpoints to be emphasized from among a pairs of videos to be used in stereoscopic playback, and videos judged to have large human figure images based on information detected by the feature detection units 112, which extract features such as size and position of human figures from pictures stored in the memory 106 from a prior frame period.

According to the predetermined standards such as those listed above, videos in which the degradation of image quality due to picture scale-down is less visually obvious are given a lower degree of preference. For a picture that has a lower degree of preference, the resolution control unit 102 determines a scale-down ratio in order to scale-down the picture to an even smaller size than a scale-down ratio calculated by the control unit 110, the scale-down ratio calculated by the control unit 110 being for scaling-down the picture of 1920 pixels vertically by 1080 pixels horizontally to match a size of one of the plurality of windows. The scale-down ratios determined by the resolution control unit 102 are notified to the AV decoders 107, the graphics creation unit 108, the first scalers 103, the additional scale-down judgment units 104 and the re-scaling judgment units 111. The notified scale-down ratios are used in the pre-memory stage procedure for scaling-down pictures, and in the post-memory stage procedure for a re-scaling judgment by the re-scaling judgment units 111.

The feature detection units 112 are functional blocks that detect human figure images from pictures read from the memory 106.

The presence of the functional blocks listed above allows the scale-down of pictures that are not visually important to an even smaller size before storage in the memory 106.

<Operation>

The operation of the rendering device relating to the second embodiment is described below.

Figure 11:
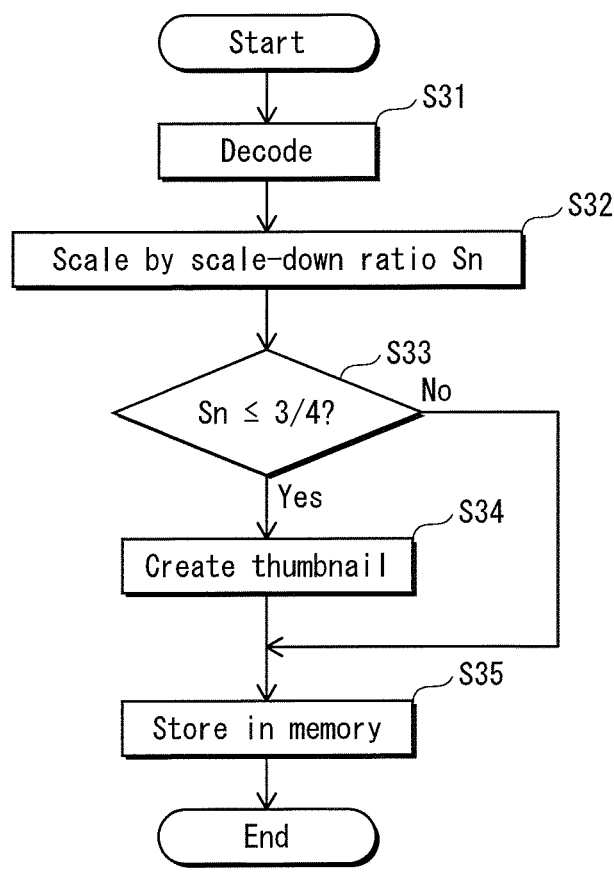
FIG. 11 is a flow chart of a procedure for storing an image object in a memory in the multi-window rendering device relating to the second embodiment.
Figure 12:
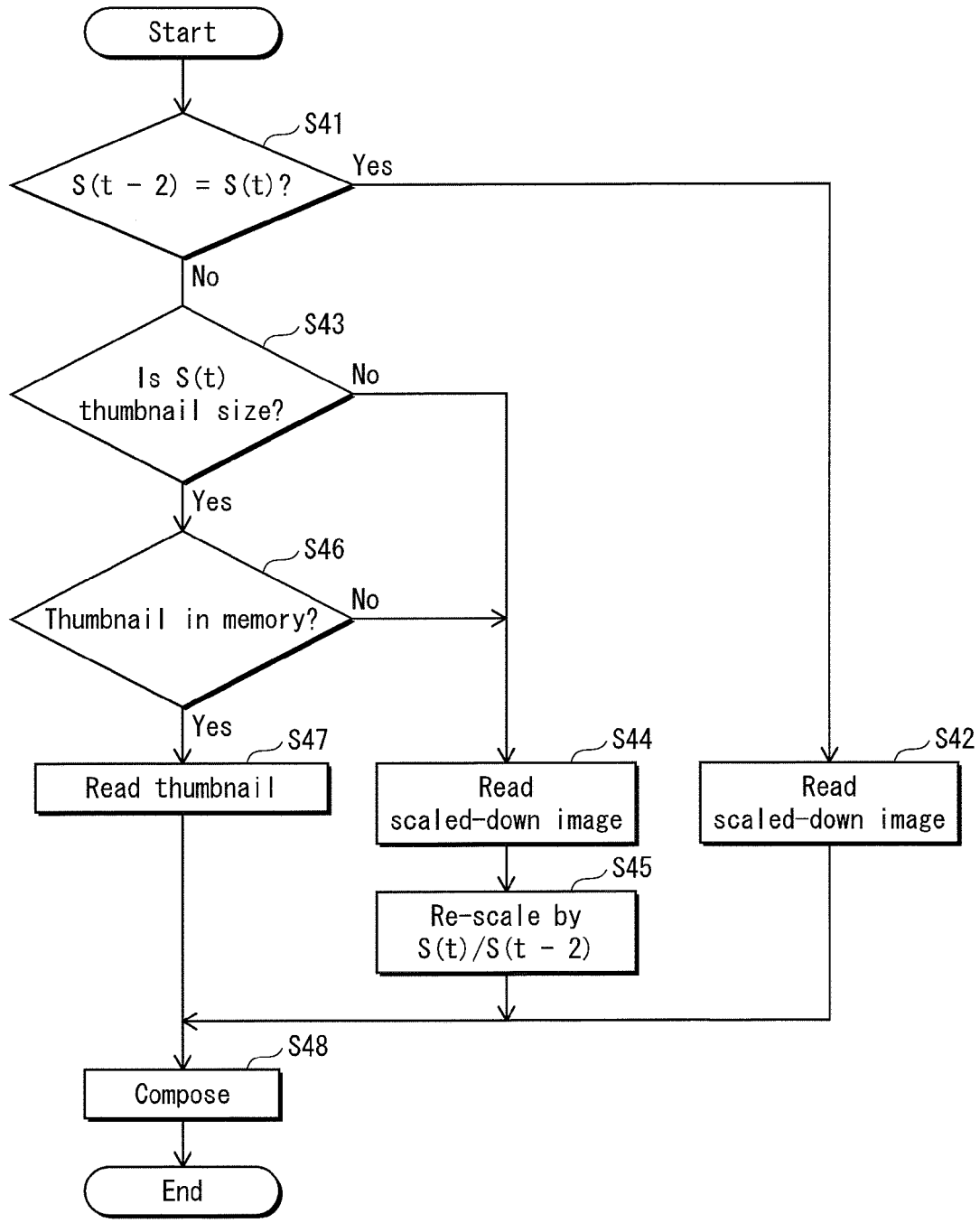
FIG. 12 is a flow chart of a procedure for rendering a composite image in the multi-window rendering device relating to the second embodiment.

FIG. 11 is a flowchart showing in detail the pre-memory stage procedure of storing an image object in the memory in the rendering device relating to the second embodiment. FIG. 12 is a flowchart showing the post-memory stage procedure of rendering a composite image in the rendering device relating to the second embodiment.

The pre-memory stage procedure in the rendering device relating to the second embodiment is broadly the same as the pre-memory stage procedure in the rendering device relating to the first embodiment shown in FIG. 8. However, differences are that: in Step S32 the first scaler 103 creates a scaled-down picture using a scale-down ratio notified by the resolution control unit 103; in Step S33 the additional scale-down judgment unit 104 determines if a scale-down ratio notified by the resolution control unit 102 is no larger than 3/4; and, in Step S34 if the scale-down ratio is no larger than 3/4 (Step S33: Yes), the additional scaler 105 uses the scaled-down picture output by the corresponding first scaler 103 as an original image to create a thumbnail size scaled-down picture.

Other aspects of the pre-memory stage procedure are the same as the pre-memory stage procedure for storing an image object in the memory described for the first embodiment.

As shown in FIG. 12, in Step S41 of the post-memory stage procedure the re-scaling judgment unit 111 compares a scale-down ratio S(t) notified by the scenario processor 101 for a current frame period and a scale-down ratio S(t−2) notified by the resolution control unit 102 two frame periods prior to the current frame period. If the scale-down ratios are identical (Step S41: Yes), the second scaler 113 reads the scaled-down picture from the memory 106 (Step S42), and outputs the scaled-down picture without re-scaling to the composing unit 115. The composing unit 115 composes a multi-window screen (Step S48), and thus the post-memory stage procedure is complete.

If the scale-down ratios are judged to be different in Step S41 (Step S41: No), the re-scaling judgment unit 111 notifies the scale-down ratios S(t) and S(t−2) to the second scaler 113.

Upon notification of the scale-down ratios S(t) and S(t−2), the second scaler 113 determines if the scale-down ratio for the current frame period S(t) corresponds to a thumbnail size (Step S43). If the scale-down ratio S(t) does not correspond to a thumbnail size (Step S43: No), the second scaler 113 reads from the memory 106 a picture scaled using the scale-down ratio S(t−2) (Step S44). The second scaler 113 re-scales the scaled-down picture read from the memory 106 by a factor of S(t)/S(t−2), creating a re-scaled picture (Step S45). The re-scaled picture is output by the second scaler 113 to the composing unit 115 which then composes a multi-window screen (Step S48).

If the scale-down ratio S(t) corresponds to a thumbnail size (Step S43: Yes) and a thumbnail size scaled-down picture is stored in the memory 106 (Step S46: Yes), the second scaler 113 reads the thumbnail size scaled-down picture from the memory 106. The second scaler 113 outputs the thumbnail sized scaled-down picture to the composing unit 115 without re-scaling, and the composing unit 115 composes a multi-window screen (Step S48).

If the scale-down ratio S(t) corresponds to a thumbnail size (Step S43: Yes), but a thumbnail size scaled-down picture is not stored in the memory 106 (Step S46: No), the second scaler 113 reads a picture scaled by the scale-down ratio S(t−2) from the memory 106 (Step S44). The second scaler performs re-scaling on the scaled-down picture read from the memory 106 by a factor S(t)/S(t−2), creating a re-scaled picture (Step S45). The second scalar 113 outputs the re-scaled picture to the composing unit 115, and the composing unit 115 composes a multi-window screen (Step S48).

The above explains the operation of the rendering device relating to the second embodiment.

In the configuration explained in the second embodiment, pictures which are not visually important are further scaled-down in size prior to storage in the memory 106, therefore the required memory bandwidth is further reduced.

Furthermore, in the pre-memory stage procedure in addition to creating a scaled-down picture using a scale-down ratio notified by the scenario processor, a thumbnail size picture is also created and stored in the memory. Thumbnail size pictures have a high frequency of usage in the multi-window display relating to the second embodiment, therefore a number of instances in which re-scaling is required after reading from the memory is reduced and image quality degradation due to re-scaling is avoided.

The present embodiment was explained for a multi-window display arranging two videos on a screen wherein the two videos are scaled-down, and the image selected by the user is displayed large at 1/2 the screen size and the non-selected image is displayed at thumbnail size. The rendering device related to the present embodiment is also able to realize various other multi-window displays through the use of arbitrary rendering scenarios.

For example the present embodiment can also deal with a multi-window display such as that shown in FIG. 13 wherein a single image object is centrally positioned on the screen with little shape distortion, and other scaled-down re-shaped image objects are displayed one each at positions left, right and below the centrally positioned image object. By writing a function into the rendering scenario for substitution of image object positions in the multi-window display such that when an "up" button, a "down" button, a "left" button or a "right" button of a remote controller is pressed, an image object corresponding to the pressed direction is displayed centrally on the screen, it is possible to modify positions and shapes of each image object in the multi-window screen through execution of the function by the scenario processor.

Figure 13:
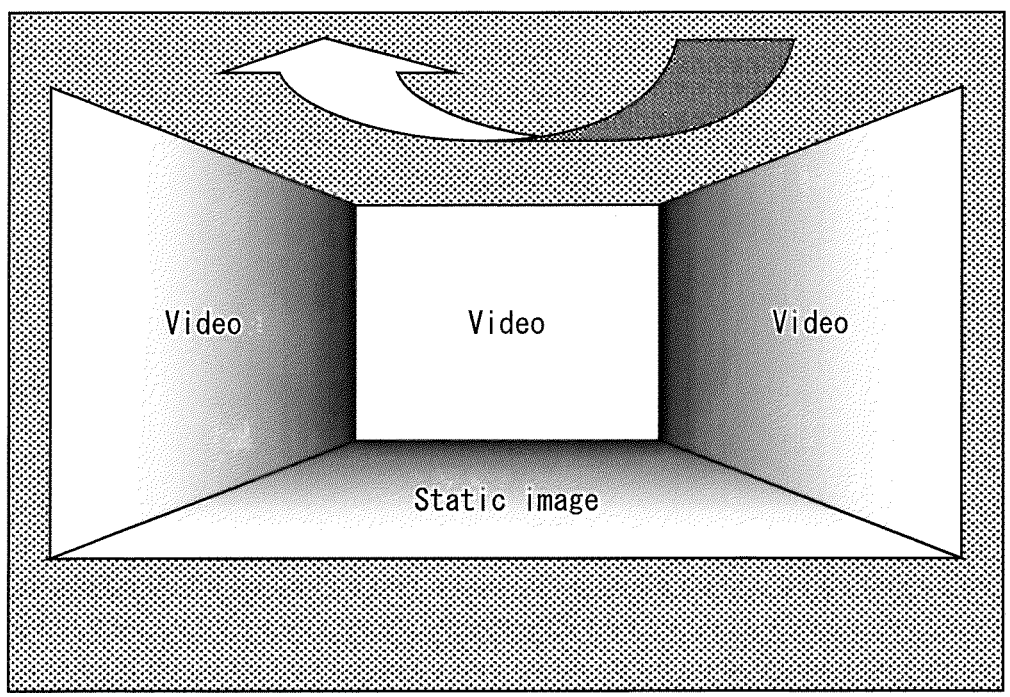
FIG. 13 shows an example of another multi-window screen.

In a multi-window display such as shown in FIG. 13, in comparison to the centrally positioned image object, the image objects positioned to the left, right and below the centrally positioned image object each have a higher degree of shape distortion from the original shape of the image object. Therefore, image quality degradation occurring due to scaling-down is not visually obvious for the image objects positioned left, right and below the centrally positioned image object. In the type of situation given above, the resolution control unit 102 determines that the images positioned to the left, right and below the centrally positioned image are images in which image quality degradation due to scaling-down is not visually obvious, and sets scale-down ratios so that the images positioned left, right and below the centrally positioned image are scaled-down to smaller sizes by the first scalers than the centrally positioned image.

(Third Embodiment)

Figure 14:
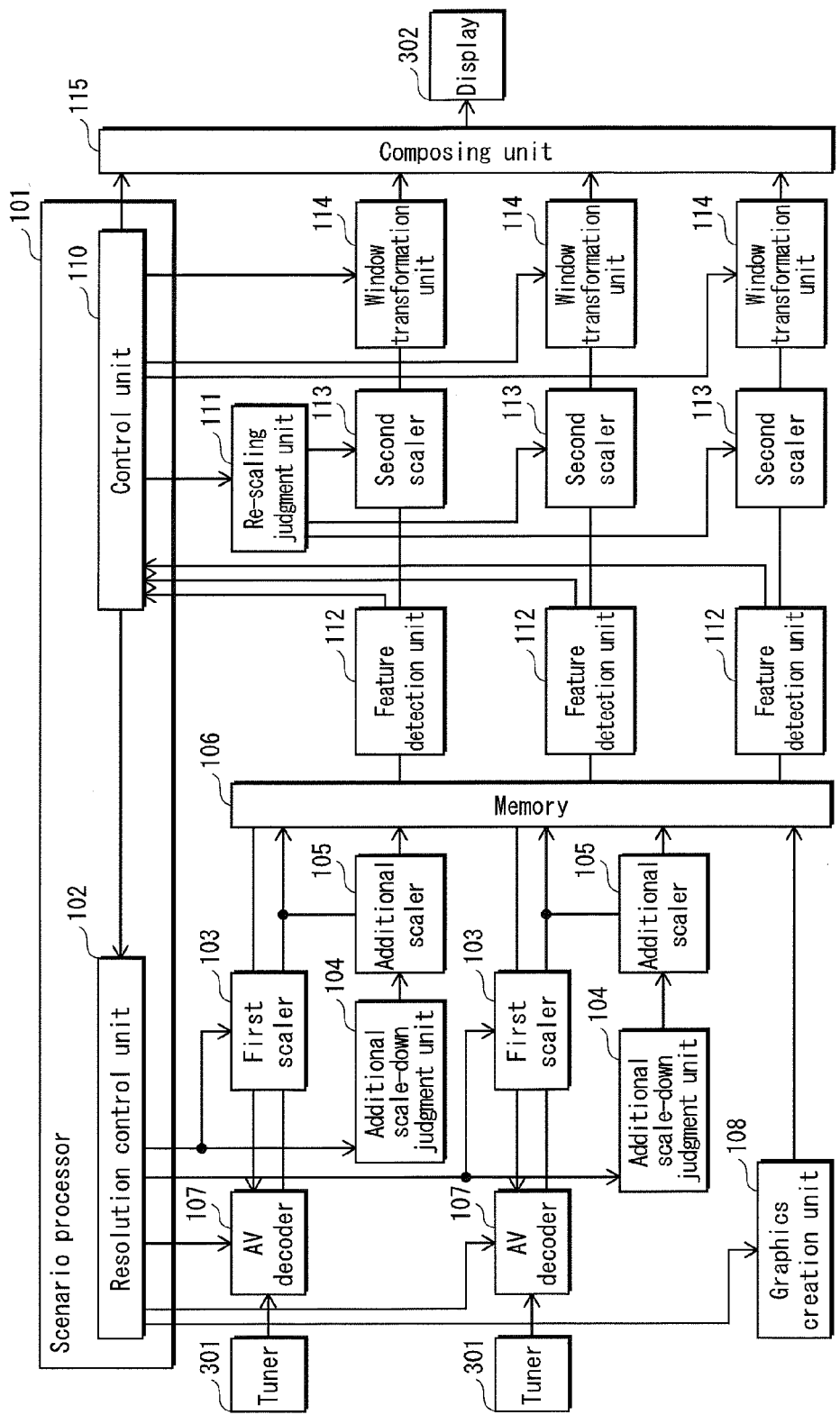
FIG. 14 is a block diagram of a television relating to a third embodiment.

FIG. 14 shows the hardware configuration of a television relating to a third embodiment of the present invention.

The television relating to the third embodiment has the same configuration as the rendering device relating to the second embodiment shown in FIG. 10, but also additionally includes a plurality of tuners 301 and a display 302.

Each of the tuners 301 selects an indicated channel from received television broadcast waves and acquires encoded data of a video for a screen size of 1920 pixels vertically and 1080 pixels horizontally. The encoded data of the videos acquired by the tuners 301 is output to the AV decoders 107.

The display 302 is a liquid crystal display of size 1920 pixels vertically and 1080 pixels horizontally, configured to display a multi-window image composed by the composing unit 115.

In the configuration explained for the present embodiment, by scaling-down each of the pictures to become an image object before storage in the memory the required memory bandwidth is reduced, and by re-scaling each of the scaled-down pictures after reading from the memory, to match a scale-down ratio required for a current frame period, a television in which multi-window display has a high degree of responsiveness to rendering scenarios is realized.

(Other Modified Examples)

The present invention was explained based on the embodiments listed above, however the present invention is by no means limited to the embodiments listed above. The present invention also encompasses cases such as those listed below.

(1) The present invention may be a method of controlling a rendering device, disclosed in the flowchart procedure for each embodiment. Alternatively, the present invention may be a computer program containing a program code for operating a computer in accordance with the procedure for each embodiment, or a digital signal created by the computer program.

Also, the present invention may be a recordable medium capable of being read by a computer such as a floppy disk, a hard disk, a CD-ROM, an MO, a DVD, a DVD-ROM, a DVD-RAM, a BD (Blu-ray Disc) or a semiconductor memory with the computer program or digital signal recorded thereon.

Furthermore, the present invention may transmit the computer program or digital signal via networks such as the Internet, electronic communication lines, and wireless or wired communication lines.

Additionally, through transfer of the computer program or the digital signal via recording to the recording medium, or through transfer of the computer program or digital signal via the network, execution may be carried out by a different independent computer system.

(2) The present invention may also be realized as an LSI for controlling the rendering device recited in the embodiments listed above. This type of LSI is realized by integration of functional blocks shown in FIG. 1, FIG. 10 and FIG. 13. The functional blocks may each be individually integrated into single chips, or a part or all of the functional blocks may be integrated into a single chip.

The above description refers to LSI, however depending on the degree of integration it may also be called system LSI, super LSI or ultra LSI.

Furthermore, the method for circuit integration is not limited to LSI and could alternatively be realized by a dedicated circuit or a general purpose processor. It is also possible to use an FPGA (Field Programmable Gate Array) programmable after manufacturing LSIs or a reconfigurable processor in which connection and setting of a circuit cell inside an LSI is reconfigurable after manufacturing LSIs.

Furthermore, if a new circuit integration technique that could replace LSIs were to arise from advances in semiconductor technologies or semi-conductor derived technologies, the new technique could of course be used for the integration of functional blocks and other components. One possibility lies in adaptation of biotechnology.

In particular, through the configuration of integrated or dedicated circuits as explained above, it is possible to realize the functions of: the scenario processor analyzing a rendering scenario of a virtual space video and calculating a scale-down ratio for each frame period, the scale-down ratio being for fitting each of a plurality of image objects to a region in the virtual space video corresponding to one of a plurality of surfaces of a virtual space object; the plurality of acquiring units each acquiring an image for the frame period; the plurality of first scalers scaling-down the plurality of acquired image objects; the plurality of second scalers reading the plurality of scaled-down image objects from the memory and re-scaling to match scale-down ratios calculated by the scenario processor for a current frame period; the composing unit composing each of the plurality of re-scaled image objects re-scaled by the second scalers on a region in the virtual space video corresponding to one of the surfaces of the virtual space object; each of the third scalers creating an additionally scaled-down image object scaled-down using a smaller scale-down ratio than the scale-down ratios used by a corresponding first scaler when the scale-down ratio used by the corresponding first scaler is smaller than a pre-determined scale-down ratio; and, the image feature detection units detecting human figure images from the plurality of image objects. Furthermore, each of the functions recited above may be realized by a configuration in which there is coaction of the processor and a program in the memory.

The present invention may also be any combination of the embodiments or modified examples recited above.

INDUSTRIAL APPLICABILITY

A rendering device relating to the present invention can realize a system LSI with improved multi-window display expression through lowering costs by reduction of memory bandwidth, memory amount and operation frequency, and also through improved image quality and improved rendering responsiveness to rendering scenarios. It is also applicable for use in devices such as optical disk recorders, televisions, tablets, smartphones and cellular phones.

REFERENCE SIGNS LIST 101 scenario processor
102 resolution control unit
103 first scaler
104 additional scale-down judgment unit
105 additional scaler
106 memory
107 AV decoder
108 graphics creation unit
110 control unit
111 re-scaling judgment unit
112 feature detection unit
113 second scaler
114 window transformation unit
115 composing unit
301 tuner
302 display

The invention claimed is:

1. A rendering device that renders a virtual space video of a projected virtual space object varying in at least one of shape and position over a plurality of frame periods, and having a plurality of image objects pasted on a plurality of surfaces of the virtual space object in one-to-one correspondence, the rendering device comprising:
   a scenario processor configured to analyze a rendering scenario of the virtual space video to calculate a scale-down ratio with respect to each of a plurality of image objects for a target frame period included in the frame periods, the scale-down ratio being for fitting the image object to a region in the virtual space video corresponding to one of the plurality of surfaces of the virtual space object, the target frame period being a period in which the virtual space video is to be displayed;
   a plurality of acquiring units each configured to acquire an image object for the frame period;
   a plurality of first scalers configured to scale-down the acquired image objects;
   a memory configured to store therein the scaled-down image objects;
   a plurality of second scalers configured to, when the target frame period is a current frame period, read from the memory the scaled-down image objects and re-scale each of the scaled-down image objects to match a scale-down ratio calculated by the scenario processor for the current frame period; and
   a composing unit configured to compose each of the re-scaled image objects on a region in the virtual space video corresponding to one of the surfaces of the virtual space object, wherein
   the rendering scenario includes a scaling function for each of the image objects, the scaling function designating as an argument the scale-down ratio in any of an X-axis direction, a Y-axis direction, and a Z-axis direction,
   after n predetermined frame periods have passed, the scenario processor displays each of the image objects at the scale-down ratio designated by the argument of the scaling function,
   from when a 1st frame period passes to when an n−1st frame period passes, the scenario processor changes the scale-down ratio in stages in accordance with the number of passed frame periods, and
   the target frame is one of frame periods to which the scale-down ratio which is changed in stages is allocated.

2. A rendering device that renders a virtual space video of a projected virtual space object varying in at least one of shape and position over a plurality of frame periods, and having a plurality of image objects pasted on a plurality of surfaces of the virtual space object in one-to-one correspondence, the rendering device comprising:
   a scenario processor configured to analyze a rendering scenario of the virtual space video to calculate a scale-down ratio with respect to each of a plurality of image objects for a target frame period included in the frame periods, the scale-down ratio being for fitting the image object to a region in the virtual space video corresponding to one of the plurality of surfaces of the virtual space object, the target frame period being a period in which the virtual space video is to be displayed;
   a plurality of acquiring units each configured to acquire an image object for the frame period;
   a plurality of first scalers configured to scale-down the acquired image objects;
   a memory configured to store therein the scaled-down image objects;
   a plurality of second scalers configured to, when the target frame period is a current frame period, read from the memory the scaled-down image objects and re-scale each of the scaled-down image objects to match a scale-down ratio calculated by the scenario processor for the current frame period;
   a composing unit configured to compose each of the re-scaled image objects on a region in the virtual space video corresponding to one of the surfaces of the virtual space object; and
   a plurality of third scalers that are in one-to-one correspondence with the first scalers and are each configured, when a scale-down ratio used by a corresponding first scaler on the acquired image object is smaller than a predetermined scale-down ratio, to create an additionally scaled-down image object, corresponding to the scaled-down image object, using a smaller scale-down ratio than the scale-down ratio used by the corresponding first scaler, and to store both the additionally scaled-down image object and the scaled-down image object in the memory, wherein
   each of the additionally scaled-down image objects stored in the memory is read from the memory and re-scaled by the second scalers to create a re-scaled image object, and
   each of the scaled-down image objects stored in the memory is only read from the memory and re-scaled by the second scalers to create a re-scaled image object when no additionally scaled-down image object corresponding to the scaled-down image object is stored in the memory.

3. The rendering device in claim 2, wherein
   the additionally scaled-down image object is a mipmap of the acquired image object.

4. The rendering device in claim 3, wherein
   the predetermined scale-down ratio is 3/4.

5. A rendering device that renders a virtual space video of a projected virtual space object varying in at least one of shape and position over a plurality of frame periods, and having a plurality of image objects pasted on a plurality of surfaces of the virtual space object in one-to-one correspondence, the rendering device comprising:
   a scenario processor configured to analyze a rendering scenario of the virtual space video to calculate a scale-down ratio with respect to each of a plurality of image objects for a target frame period included in the frame periods, the scale-down ratio being for fitting the image object to a region in the virtual space video corresponding to one of the plurality of surfaces of the virtual space object, the target frame period being a period in which the virtual space video is to be displayed;

a plurality of acquiring units each configured to acquire an image object for the frame period;

a plurality of first scalers configured to scale-down the acquired image objects;

a memory configured to store therein the scaled-down image objects;

a plurality of second scalers configured to, when the target frame period is a current frame period, read from the memory the scaled-down image objects and re-scale each of the scaled-down image objects to match a scale-down ratio calculated by the scenario processor for the current frame period; and a composing unit configured to compose each of the re-scaled image objects on a region in the virtual space video corresponding to one of the surfaces of the virtual space object, wherein a delay equivalent to a frame period k occurs for combined actions of writing to and reading from the memory each of the scaled-down image objects, and when one of the acquired image objects is scaled-down by one of the first scalers using a scale-down ratio S1 at a frame period t-k temporally in the past, one of the second scalers reads from the memory the scaled-down image object scaled-down using the ratio S1 and re-scales the scaled-down image object for a current frame period t where the scale-down ratio calculated by the scenario processor is S2, by using a factor of S2/S1.

6. The rendering device in claim 5, wherein
the scale-down ratio used by each of the first scalers is the scale-down ratio calculated by the scenario processor with respect to each of the image objects for the current frame period.

7. The rendering device in claim 5, wherein
the smaller a shape specified by the rendering scenario for each of the image objects, the smaller a scale-down ratio used by each of the first scalers.

8. The rendering device in claim 5, wherein
the larger a distortion in an image object pasting shape specified by the rendering scenario for each of the image objects compared to an original shape of the image object, the smaller a scale-down ratio used by each of the first scalers.

9. The rendering device in claim 5, wherein
the larger a variation over time in an image object pasting position specified by the rendering scenario for each of the image objects, the smaller a scale-down ratio used by each of the first scalers.

10. The rendering device in claim 5, further comprising
a plurality of image feature detection units each configured to detect a human figure image from an image object, wherein
the smaller the human figure image detected in each of the image objects by the feature detection units, the smaller a scale-down ratio used by each of the first scalers.

11. The rendering device in claim 5, wherein
the plurality of image objects include at least one pair of viewpoint images to be used in stereoscopic playback, and
a scale-down ratio used by one of the first scalers on one of the pair of viewpoint images is larger than a scale-down ratio used by another one of the first scalers on the other of the pair of viewpoint images.

12. An integrated circuit that is incorporatable into the rendering device in claim 5, the integrated circuit comprising:
the scenario processor;
the acquiring units;
the first scalers;
the memory;
the second scalers; and
the composing unit.

13. The rendering device in claim 5, being a television device,
wherein
the acquiring units each include:
a tuner configured to acquire a plurality of pieces of encoded data of a video; and
a decoder configured to acquire a plurality of image objects by decoding the acquired plurality of pieces of encoded data of the videos, and
the television device further comprises
a display configured to display the virtual space video composed by the composing unit using the plurality of image objects.

14. A method for controlling a rendering device that renders a virtual space video of a projected virtual space object varying in at least one of shape and position over a plurality of frame periods, and having a plurality of image objects pasted on a plurality of surfaces of the virtual space object in one-to-one correspondence, the method comprising:

an analyzing step of analyzing a rendering scenario of the virtual space video to calculate a scale-down ratio with respect to each of a plurality of image objects for a target frame period included in the frame periods, the scale-down ratio being for fitting the image object to a region in the virtual space video corresponding to one of the plurality of surfaces of the virtual space object, the target frame period being a period in which the virtual space video is to be displayed;

an acquiring step of acquiring a plurality of image objects for the frame period;

a first scaling step of scaling-down the acquired image objects;

a storing step of storing the scaled-down image objects in a memory of the rendering device;

a second scaling step of, when the target frame period is a current frame period, reading the scaled-down image objects stored in the memory and re-scaling each of the scaled-down image objects to match a scale-down ratio calculated for the current frame period; and a composing step of composing each of the re-scaled image objects on a region in the virtual space video corresponding to one of the surfaces of the virtual space object, wherein after n predetermined frame periods have passed, the analyzing step displays each of the image objects at the scale-down ratio designated by an argument of a scaling function, from when a 1st frame period passes to when an n−1st frame period passes, the analyzing step changes the scale-down ratio in stages in accordance with the number of passed frame periods, and the target frame is one of frame periods to which the scale-down ratio which is changed in stages is allocated.

* * * * *